US012154443B2

(12) United States Patent
Yocam et al.

(10) Patent No.: US 12,154,443 B2
(45) Date of Patent: *Nov. 26, 2024

(54) MOBILE AERIAL DRONE EARLY WARNING PRIVACY BREACH DETECT, INTERCEPT, AND DEFEND SYSTEMS AND METHODS

(71) Applicant: T-Mobile USA, Inc., Bellevue, WA (US)

(72) Inventors: Eric Yocam, Sammamish, WA (US); Damon Laursen, Mukilteo, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,070

(22) Filed: Aug. 2, 2023

(65) Prior Publication Data

US 2024/0177620 A1     May 30, 2024

Related U.S. Application Data

(63) Continuation of application No. 17/591,556, filed on Feb. 2, 2022, now Pat. No. 11,756,438, which is a
(Continued)

(51) Int. Cl.
*G08G 5/00*     (2006.01)
*H04W 4/02*     (2018.01)
(Continued)

(52) U.S. Cl.
CPC ......... *G08G 5/0082* (2013.01); *G08G 5/0026* (2013.01); *H04W 4/029* (2018.02);
(Continued)

(58) Field of Classification Search
CPC ... G08G 5/0082; G08G 5/0026; H04W 4/029; H04W 4/40; B64C 39/024
(Continued)

(56) References Cited

U.S. PATENT DOCUMENTS

2014/0306799 A1    10/2014   Ricci
2016/0288905 A1    10/2016   Gong et al.
(Continued)

FOREIGN PATENT DOCUMENTS

CN         105989612 A    10/2016
WO      2018171976 A1    9/2018

OTHER PUBLICATIONS

Extended European Search Report mailed Jun. 17, 2022 for EP Application No. 19868406, 7 pages.
(Continued)

*Primary Examiner* — Mahmoud S Ismail
(74) *Attorney, Agent, or Firm* — Perkins Coie LLP

(57) ABSTRACT

Systems and methods for aerial unmanned vehicle (for example, drone) early warning privacy breach detection, interception, and defense are disclosed. The system detects drones within a threshold distance of an individual or configurable location, notifies the individual of the drones' existence, tracks the drones, and executes countermeasures. The system can communicate with telecommunication networks or other sources (for example, FAA) to identify and filter out drones that are authorized to be in the airspace around the individual.

19 Claims, 9 Drawing Sheets

Related U.S. Application Data continuation of application No. 16/151,258, filed on Oct. 3, 2018, now Pat. No. 11,270,595.

(51) Int. Cl.
  *H04W 4/029* (2018.01)
  *H04W 4/40* (2018.01)
  *B64U 101/16* (2023.01)
  *B64U 101/30* (2023.01)

(52) U.S. Cl.
  CPC ........... *H04W 4/40* (2018.02); *B64U 2101/16* (2023.01); *B64U 2101/30* (2023.01)

(58) Field of Classification Search
  USPC .......................................................... 701/1
  See application file for complete search history.

(56) References Cited

U.S. PATENT DOCUMENTS

| | | | |
|---|---|---|---|
| 2017/0092138 A1* | 3/2017 | Trundle | B64C 39/024 |
| 2017/0359554 A1* | 12/2017 | Madhav | H04N 7/185 |
| 2018/0019801 A1* | 1/2018 | Dowlatkhah | B64D 47/00 |
| 2018/0069650 A1 | 3/2018 | Tran et al. | |
| 2018/0211263 A1* | 7/2018 | Gong | G08G 5/0043 |
| 2018/0222582 A1* | 8/2018 | Ohata | B64F 1/36 |
| 2020/0057133 A1* | 2/2020 | Arteaga | B64C 39/024 |
| 2020/0272827 A1* | 8/2020 | Morrow | H04K 3/65 |
| 2020/0344569 A1* | 10/2020 | Burgess | G05D 1/0027 |

OTHER PUBLICATIONS

International Searching Authority, International Search Report and Written Opinion, PCT Patent Application PCT/US2019/053892, mailed Jan. 17, 2020, 11 pages.

* cited by examiner

MOBILE AERIAL DRONE EARLY WARNING PRIVACY BREACH DETECT, INTERCEPT, AND DEFEND SYSTEMS AND METHODS

CROSS-REFERENCE TO RELATED APPLICATIONS

This application is a continuation of U.S. patent application Ser. No. 17/591,556, filed Feb. 2, 2022, entitled MOBILE AERIAL DRONE EARLY WARNING PRIVACY BREACH DETECT, INTERCEPT, AND DEFEND SYSTEMS AND METHODS, which is a continuation of U.S. patent application Ser. No. 16/151,258, filed Oct. 3, 2018, now U.S. Pat. No. 11,270,595 entitled MOBILE AERIAL DRONE EARLY WARNING PRIVACY BREACH DETECT, INTERCEPT, AND DEFEND SYSTEMS AND METHODS, which are hereby incorporated by reference in their entireties.

BACKGROUND

Experts estimate that by the end of 2018, 3.5 million drones would have been sold in the United States. A primary concern of this exponential growth of drones is their potential use by individuals to invade the privacy of others. For instance, the Federal Aviation Administration (FAA) has collected over 6,000 reports of potentially unsafe use of drones so far. As drones become more affordable, smaller in size, and less noticeable in the airspace, privacy concerns become increasingly prevalent. While current federal regulations require that unmanned vehicles remain below 400 feet, they mainly regulate such matters by regulating the qualifications for operators and the precise systems for keeping track of the unmanned vehicles in flight. Certain states have passed laws that address privacy concerns by holding drone operators violating an individual's privacy to be trespassers. But, currently no systems or methods exist for individuals to affirmatively protect their privacy.

Figure 1:
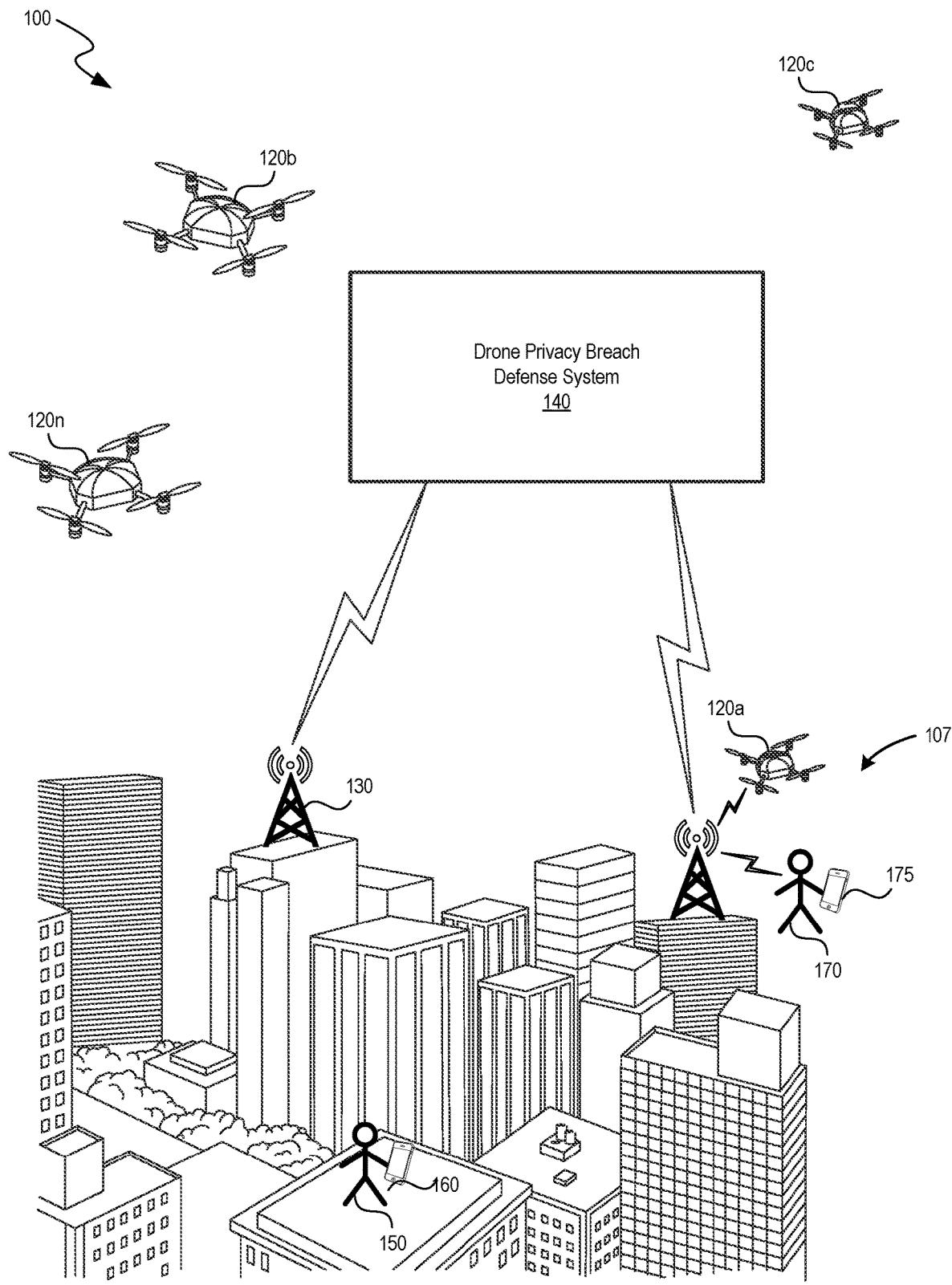
FIG. 1 illustrates an example of an environment in which some implementations of the present technology can be utilized.

The drawings have not necessarily been drawn to scale. Similarly, some components and/or operations can be separated into different blocks or combined into a single block for the purposes of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Systems and methods for aerial unmanned vehicle (for example, drone) early warning privacy breach detection, interception, and defense are described herein. While the disclosure uses the term "drone," one of ordinary skill in the art would understand that the discussion would apply to other similar unmanned vehicles. Various implementations discussed below address different aspects of the infrastructure needed for a drone privacy breach defense system capable of detecting drones within a threshold distance of an individual, alerting the individual of the drones' existence, tracking the drones, and executing countermeasures. The infrastructure can include a mobile application including a detection and location module, an alert/notification module, a tracking module, a countermeasures module, and a communications interface for communicating with one or more telecommunications networks, all of which are described in detail below. Overall, the system and methods can detect the presence of drones and deploy countermeasures against these drones before (and/or while) the drones are invading the individual's privacy (for example, by capturing images using the drone's camera), as well as provide other benefits.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the present technology, and can be included in more than one implementation. In addition, such phrases do not necessarily refer to the same implementations or different implementations.

FIG. 1 illustrates an example of an environment 100 in which some implementations of the present technology can be utilized. As illustrated in FIG. 1, environment 100 shows a geographical region (for example, a city or metro area) 107 that has multiple drones 120A-120N (such as a quadcopter or other autonomous aircraft), communications network 130, a drone privacy breach defense system 140, a drone operator 170 with an operating device 175, and a privacy defense system user 150 with a user device 160. One or more drones 120A-120N can breach the privacy of the user 150. The privacy defense system user can use one or more user devices 160 to detect, intercept, and/or defend against the privacy breach(es), via the drone privacy breach defense system 140. The drone privacy breach defense system 140 can be embedded within the one or more user devices 160. Examples of user devices include, but are not limited to mobile devices (for example, mobile phones, tablets, laptops, and so on), Internet of Things (IoT) devices, smart devices (for example, wearable technology devices such as a smart watch, smart glasses, and so on), security devices (for example, anti-theft/anti-privacy breach devices operated by security operators), and so on.

Drones 120A-120N can include network communication components that enable the drones to communicate with drone privacy breach defense system 140 or other portable electronic devices (not shown) by transmitting and receiving wireless signals using licensed, semi-licensed or unlicensed spectra over communications network 130. Drones 120A-120N can receive signals using one or more operating devices 175 of a drone operator 170.

In some cases, communication network 130 can comprise multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 130 can also include third-party communications networks such as a Global System for Mobile (GSM) mobile communications network, a code/time division multiple access (CDMA/TDMA) mobile communications network, a 3rd, 4th or 5th generation (3G/4G/5G) mobile communications network (for example, General Packet Radio Service (GPRS/EGPRS)), Enhanced Data rates for GSM Evolution (EDGE), Universal Mobile Telecommunications System (UMTS), or Long Term Evolution (LTE) network), or other communications network.

Those skilled in the art will appreciate that various other components (not shown) can be included in drones 120A-120N to enable network communication. For example, a drone can be configured to communicate over a GSM or newer mobile telecommunications network. As a result, the drone 120A-120N can include and/or be associated with a Subscriber Identity Module (SIM) card (including embedded and/or integrated SIMs such as eSIM, iSIM, and so on) that stores an International Mobile Subscriber Identity (IMSI) number that is used to identify the drones 120A-120N on the GSM mobile or other communications networks, for example, those employing 3G, 4G, 5G, and/or other wireless protocols. One advantage of this type of configuration is that the drone can be equipped with one or more cellular radios to permit direct communication with users (drone operators and/or privacy defense system users), for example sending a text when the drone approaches a geographic area and/or individual. If drone 120A-120N is configured to communicate over another communications network, the drone 120A-120N can include other components that enable it to be identified on the other communications networks.

Drones 120A-120N can include components that enable them to connect to a communications network using Generic Access Network (GAN), Unlicensed Mobile Access (UMA), or LTE-U standards and protocols. For example, drones 120A-120N can include components that support Internet Protocol (IP)-based communication over a Wireless Local Area Network (WLAN) and components that enable communication with the telecommunications network over the IP-based WLAN. Further, while not shown, the drones 120A-120N can include capabilities for permitting communications with satellites. Drones 120A-120N can include one or more mobile applications that need to transfer data or check-in with one or more drone operators and/or the drone privacy breach defense system 140.

Figure 2:
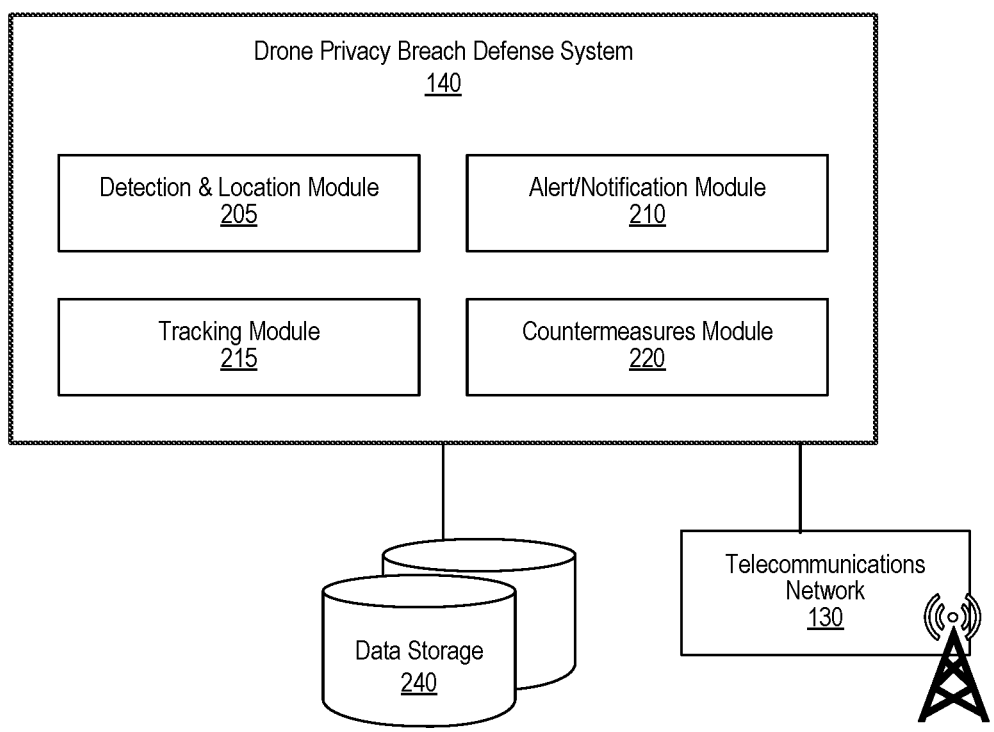
FIG. 2 illustrates a set of components of a drone privacy breach defense system according to various implementations.

FIG. 2 illustrates a set of components of a drone privacy breach defense system 140 according to various implementations. As illustrated in FIG. 2, drone privacy breach defense system 140 comprises a detection and location module 205, an alert/notification module 210, a tracking module 215, and a countermeasures module 220.

The detection and location module 205 can detect the presence of one or more drones within a vicinity of at least one privacy defense system user (and/or user device). The privacy defense system user can specify another object, user, and/or geographic location in whose vicinity the drones are to be detected. For instance, the detection and location module 205 can detect the presence of the drone(s) within a certain threshold distance/vicinity range (for example, user configurable or adaptive) of the privacy defense system user. Alternatively or additionally, the detection and location module 205 can remotely monitor drones that are at a location removed from the privacy defense system user (for example, detect and locate drones that are snooping around the user's mountain cabin even when the user is in the city). The detection and location module 205 can determine the existence and/or location of the drone(s) by analyzing one or more of the following attributes of the drone(s):

- sound frequencies emitted by the drone(s),
- electromagnetic signals emitted by the drone(s),
- light emitted by the drone(s),
- heat/thermal indicators emitted by the drone(s) (for example, heat emitted by a drone's battery),
- images or video captured of the drone(s),
- unique identification code(s) associated with drone(s), and so on.

For example, the detection and location module 205 can determine the existence and location of a drone using three-dimensional sound localization techniques. As another example, the detection and location module 205 can determine the existence and location of a drone by scanning (for example, by capturing an image) of a unique identification code (for example, a Universal Product Code (UPC)) associated with the drone (for example, a UPC sticker on the drone).

The detection and location module 205 can communicate with a telecommunications network 130 (for example, a mobile carrier) to detect the existence, location, and/or other characteristics of the drone(s). For example, the detection and location module 205 can send a request to the telecommunications carrier 130 for information about one or more drones associated with the telecommunications carrier. The detection and location module 205 can analyze the information received from the telecommunications carrier 130 (for example, location coordinates) to determine whether the drone(s) associated with the telecommunications carrier 130 are within the vicinity of the privacy defense system user. The detection and location module 205 can then determine whether one or more of the detected drones are authorized to be in the airspace of the privacy defense system user (for example, as delivery drones, authorized official use drones, and so on). The detection and location module 205 can access data storage 240, telecommunications network 130, and/or any other entity (such as third-party services that maintain information about drones) to determine information about one or more aerial entities or drones that are authorized to be within the vicinity of the privacy defense system user and/or a detected location of the drone. For example, the detection and location module 205 can access a FAA database, via an API, to determine whether a drone with characteristics similar to those of a detected drone is authorized to be within a threshold distance of the privacy defense system user. The detection and location module 205 can also identify a type of the detected drone based on the one or more analyzed attributes of at least one drone. The drone type can be used by the countermeasures module 220 to select a privacy breach countermeasure executed against the drone.

The detection and location module 205 can be located within a user device (for example, embedded within a user device), be communicatively coupled to a user device (for example, as a networked component), or otherwise accessible by the user device. For example, a 3D sound detector device embedded within a user's mobile device (and/or a mobile device accessory such as wireless earbuds or other wearable) can be used to perform some or all of the functions of a detection and location module 205. Alternatively or additionally, the detection and location module 205 can be distributed among two or more devices, which operate in tandem and cooperatively to detect and/or locate drone(s). For example, two or more user devices (for example, a mobile device and an IoT device near the mobile device) can each include a detection and location module 205 such that the user device communicates with each other (or other third parties) to detect one or more drones, identify their trajectories/paths, determine additional information about the drones, or use location techniques to determine initial locations of the drones. Further, one or more cell towers (for example, associated with a telecommunication network) can include a detection and location module 205 to detect and/or locate drones within a configurable radius of the cell towers. When a detection and location module 205 associated with a cell tower then detects one or more drones, it can transmit notifications of the detected drones to users (for example, users within a configurable distance from the cell tower, users associated with the telecommunications network that manages the cell tower, users who have opted-in to receive notifications, drone operators, and so on).

Figure 6A:
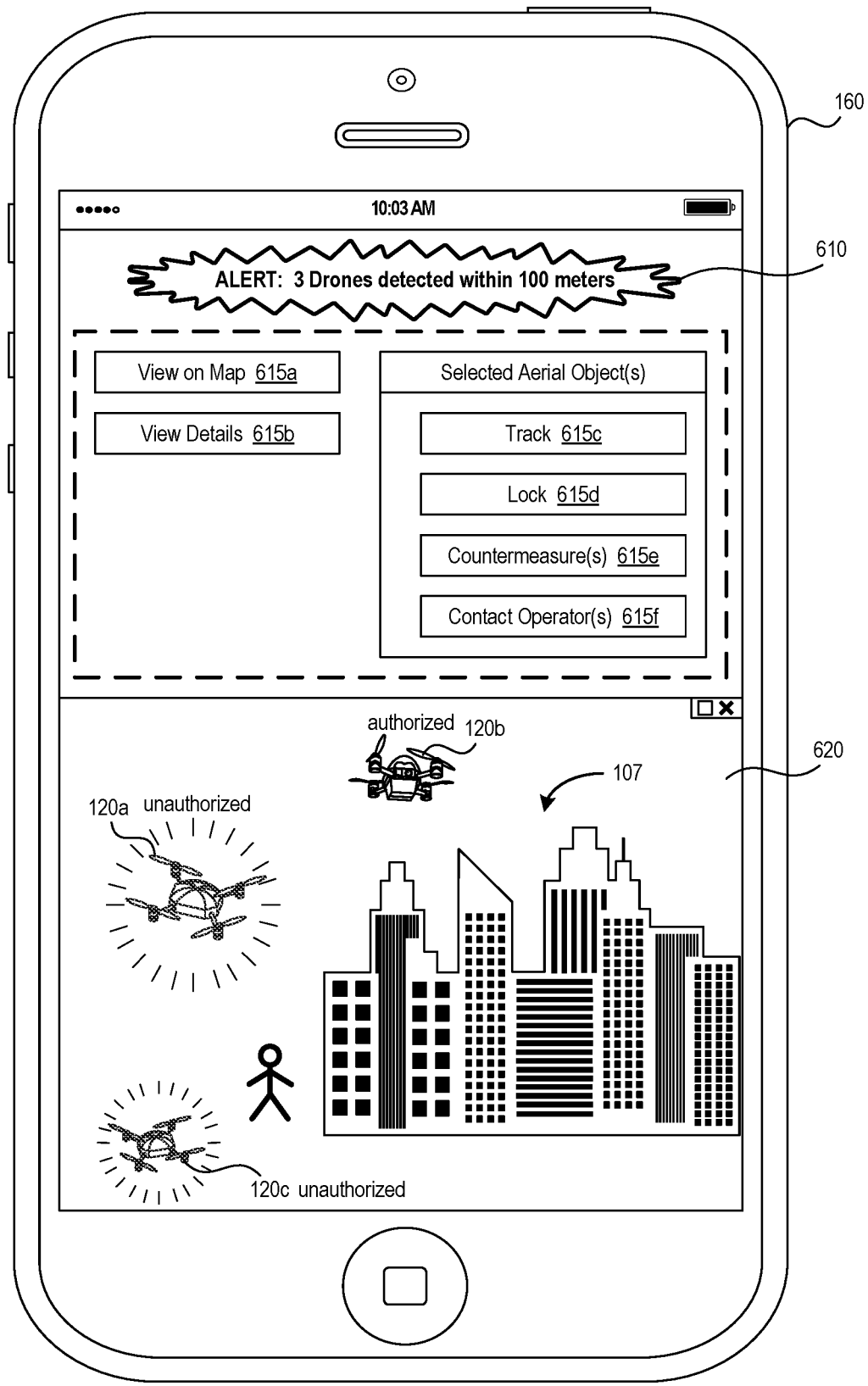
FIGS. 6A-6C are examples of a graphical user interface that can be used according to various implementations.

The alert/notification module 210 can alert or notify one or more users (for example, drone operators, privacy defense system users, family members, friends, and so on) of the existence of any detected and/or located drones. Alerts or notifications can be in the form of audio indicator(s), visual indicator(s), haptic indicator(s), or any combination thereof. FIG. 6A illustrates an example of a user interface at a user device 160 that displays an alert/notification 610 alerting a privacy defense system user of three drones within 100 meters of the user's device. The alert/notification module 210 can notify privacy defense system users of the existence of drone(s) and provide their locations within a certain radius of error. For example, the alert/notification module 210 can alert a user that a drone is present in the northwest quadrant of the user's location but may not provide the exact location of the drone. The alert/notification module 210 can gather information about the detected drone(s) (from data storage 240, telecommunications network 130, etc.) and present it to a privacy defense system user (such as illustrated in FIG. 6A). For example, the alert/notification module 210 can alert a user that a drone with a camera and a microphone (mic) has been detected within 50 meters of a preconfigured location, that the drone (and/or the drone's operator) is a subscriber of a particular telecommunications network, that the drone is not authorized to be in the airspace in the vicinity of the detected location, and so on. As another example, the drone operator can receive notifications that its drone has been detected and is being tracked by other users.

Users (drone operators and/or privacy defense system users) can sign-up, opt-in, or subscribe to receive alerts/notifications of drones from an alert/notification module 210 of the drone privacy breach defense system 140. For example, users can sign-up/opt-in/subscribe using mobile applications, scanning codes such as barcodes or QR codes, texts, phone calls, and so on. Each user can specify customized criteria for receiving alerts/notifications. Users can also specify the type and amount of information they would like to receive for the detected drone(s). For example, a first user can opt-in to receive alerts/notifications for drones with camera and mic capabilities detected within 100 meters of the first user's location, a second user can opt-in to receive alerts/notifications for drone with camera capabilities detected within 50 meters of a particular geographic location (for example, a home), and so on. The alert/notification module 210 can filter the information about detected/located drones received from the detection and location module 205 based on the users' criteria and then send appropriate alerts/notifications to users based on their criteria. Alternatively or additionally, the alert/notification module 210 can transmit the alerts/notifications in forms usable by augmented reality, virtual reality, and/or any other such applications.

The tracking module 215 can track detected drones using, for example, their initial location as detected by the detection and location module 205. The tracking module 215 can lock-in to an initial location of a drone and then use one or more tracking techniques (for example, correlation-filter based trackers (CFTs), non-correlation filter based trackers (NCFTs), and so on) to track the drone's trajectory/path. For example, the tracking module 215 can track the location changes of a drone by keeping the drone within a camera lens view of a user's device. Further, the tracking module 215 can transmit signals to a user's device to enable the user to view the tracked drones' trajectories and/or information about the tracked drones. FIG. 6C illustrates an example of a user interface at a user device that displays tracking information (for example, 635 and 650) related to detected drones 120A-120N in the vicinity of a user 150.

The countermeasures module 220 can execute one or more countermeasures against the detected, located, and/or tracked drones. Examples of countermeasures include but are not limited to:
  transmitting light-emitting diode signals,
  transmitting laser signals,
  transmitting audio signals,
  transmitting thermal signals,
  notifying the user associated with the user device,
  disabling one or more features of drone(s),
  deploying at least one counter-drone, or
  any combination thereof.

Alternately or additionally, the countermeasures module 220 can contact (for example, via telecommunications network 130) the drone's operator, affiliates, and/or associated network operators to request or instruct disablement or relocation of the drone. Alternatively or additionally, the drone privacy breach defense system can notify a drone operator when the drone enters an unauthorized territory (for example, so that the drone operator can guide the drone out of the unauthorized territory and not run afoul of any privacy laws).

The countermeasures module 220 can automatically select and/or execute countermeasures based on one or more factors including: privacy defense system's user's preferences, past behavior, authorized countermeasures, capabilities of the drone, operator associated with the drone, affiliation of the drone, and so on. Alternatively or additionally, the countermeasures module 220 can receive selections of countermeasures from a user (drone operator and/or privacy defense system user) (for example, via a user interface). Further, the countermeasures module 220 can select and execute countermeasures in an order of priority (for example, least invasive to most invasive, user configured priority, and so on). Like the detection and location module 205, the countermeasures module 220 can be associated (and/or embedded) with the user's device and/or other devices and can coordinate execution of countermeasures by one or more external devices, like controlling or instructing multiple user devices (such as, IoT devices, user's mobile device, wearable device, and so on) to perform countermeasures. For example, the countermeasures module 220 can instruct IoT devices and/or the user's mobile device to emit laser signals to block a drone's camera, instruct the user's wearable device to transmit or emit audio signals to block the drone's mic, and/or instruct IoT devices to emit thermal signals to obfuscate the drone's thermal detectors, etc. The countermeasures module 220 can execute the privacy breach countermeasures for a configurable time period. The configurable time period can be based on user preferences, location of the drone, proximity of the drone to the user's specified geographic area, features of the user specified geographic area (for example, longer time period for home location versus public areas), trajectory of the drone, features/capabilities of the drone, and so on.

Figure 3:
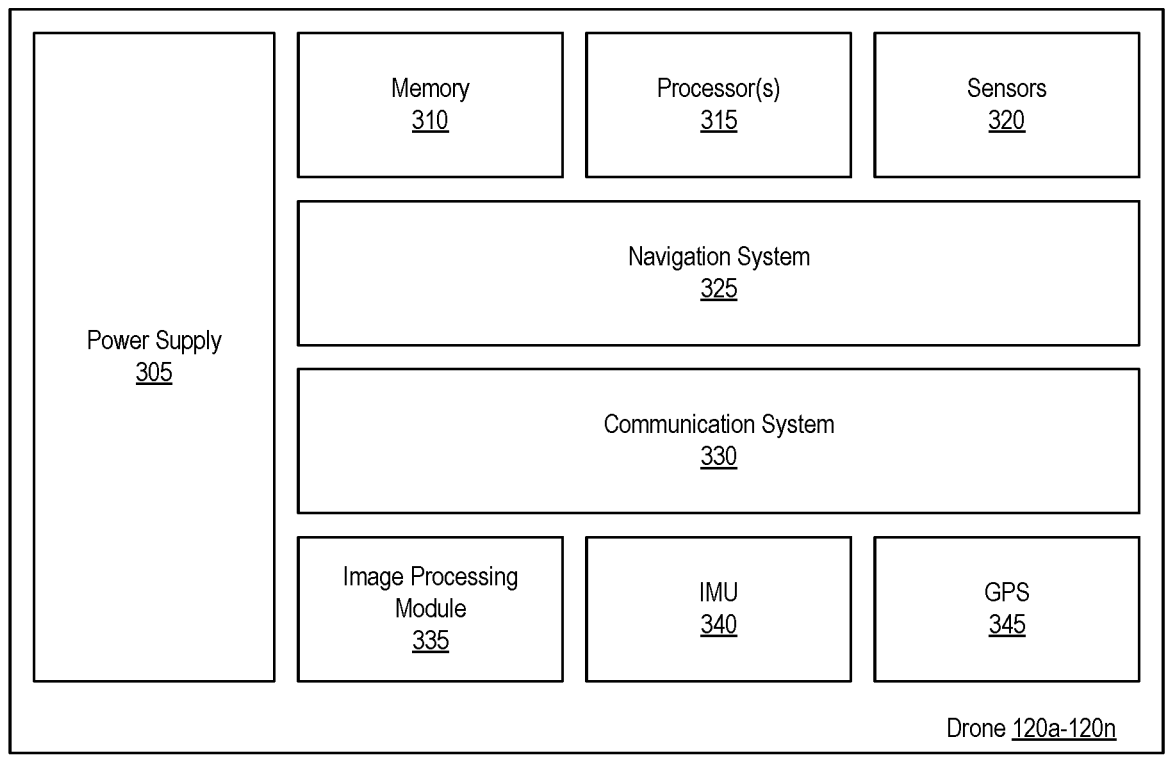
FIG. 3 illustrates a set of components within a drone according to various implementations.

FIG. 3 illustrates a set of components within drones 120A-120N according to various implementations of the present technology. As shown in FIG. 3, drones 120A-120N can include a power supply 305 (for example, battery), a memory 310 (for example, volatile memory and/or nonvolatile memory), processor(s) 315 for executing instructions and performing calculations, sensors 320, a navigation system 325, a communication system 330, an image processing module 335, an inertial measurement unit (IMU) 340, and a global positioning system (GPS) 345.

Processor(s) 315 are the main processors of drones 120A-120N which can include application processors, various coprocessors, and other dedicated processors for operating drones 120A-120N. Processor(s) 315 can be communicably coupled with memory 310 and configured to run the operating system, user interfaces, sensors 320, navigation system 325, communication system 330, image processing module 335, and/or other components. Processor(s) 315 can include multiple dedicated or shared processors configured to perform signal processing (for example, baseband processors for cellular communications), implement/manage real-time radio transmission operations, of drone 120A-120N, make navigation decisions (for example, compute flight paths, implement obstacle avoidance routines, etc.). These processors along with the other components can be powered by power supply 305. The volatile and nonvolatile memories found in various implementations can include storage media for storing information such as processor-readable instructions, data structures, program modules, or other data. Some examples of information that can be stored include basic input/output systems (BIOS), operating systems, and applications.

Sensors 320 can be used to detect events or changes in the surrounding environment and produce a corresponding signal that can be acted upon by various components within the drone or transmitted to other parts of a drone infrastructure or telecommunications network. Sensors 320 can include one or more of the following: a microphone, a camera, a thermostat, an accelerometer, light sensors, motion sensors, moisture sensors, fingerprint readers, retinal scanners, chemical sensors, scales, LIDAR, RADAR, and the like. Other sensors can be used to record the environment. As another example, battery life can vary significantly based on temperature. In some implementations, the signal generated by the microphone can be used to determine the noise level of the surrounding environment and to perform noise cancelling operations to obtain or record clear audio signals. Still yet, sensors 320 can include Bluetooth or near field communication (NFC) systems.

Figure 4:
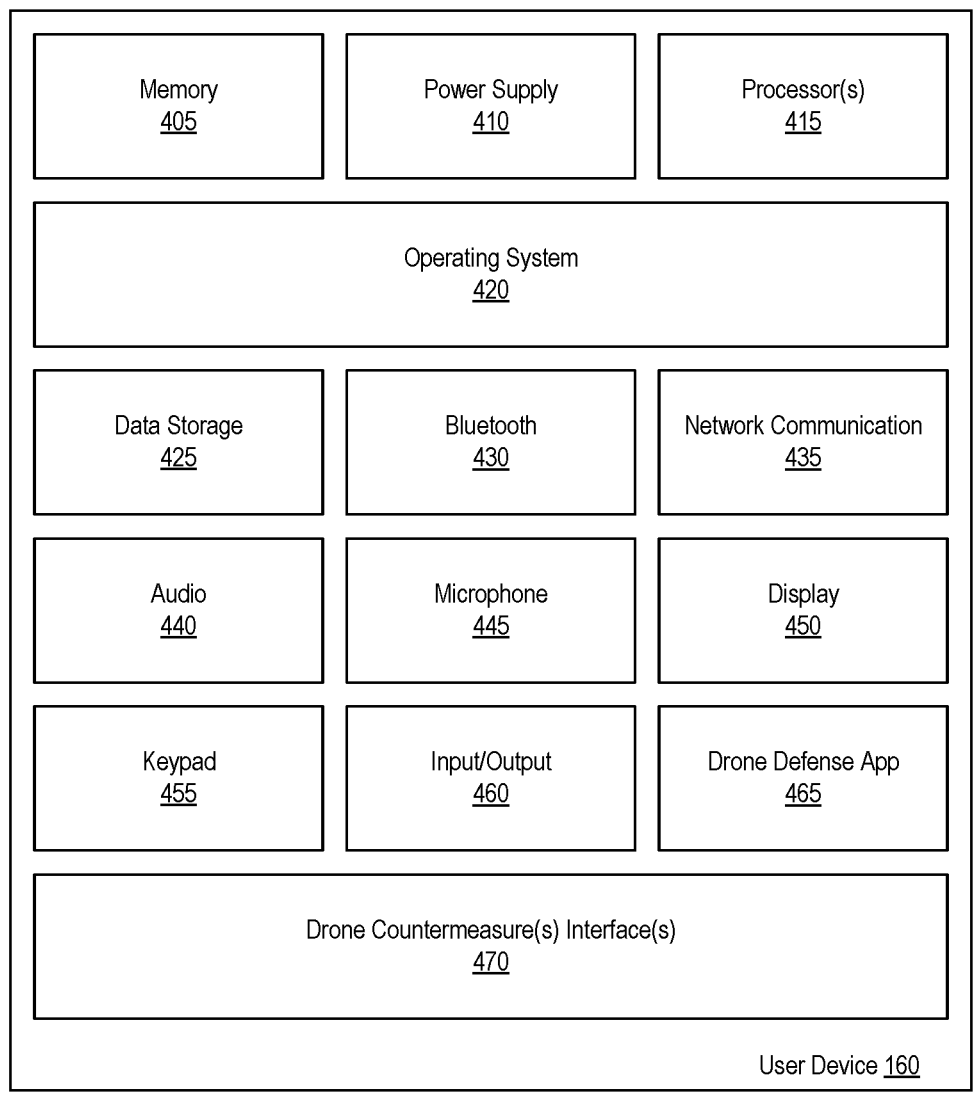
FIG. 4 illustrates a set of components within a mobile device with a drone management application according to various implementations.

FIG. 4 illustrates a set of components within a user device with a drone defense application according to various implementations of the present technology. As shown in FIG. 4, mobile device 400 can include a memory 405 (for example, volatile memory and/or nonvolatile memory), a power supply 410 (for example, battery), processor(s) 415 for executing processing instructions, and an operating system 420. Additional components can include a data storage component 425 (for example, hard drive, flash memory, memory card, etc.), an audio interface 440, a microphone 445, a display 450, a keypad or keyboard 455, other input and/or output interfaces 460 (for example, a fingerprint reader or other biometric sensor/security feature), and one or more network interfaces (for example, Bluetooth Interface 430; and Network Communication Interface 435, which enable the user device to communicate by transmitting and receiving wireless signals using licensed, semi-licensed or unlicensed spectra over a telecommunications network). The various components of the user device 160 can be interconnected via a bus.

Processor(s) 415 are the main processors of user device 160, and they can be the same type of processors as processors 315. The drone defense application 465 includes or is communicatively coupled to one or more components/modules of a drone privacy breach defense system and can be installed on user device 160. The drone defense application 465 can be used to detect, intercept, and/or defend against privacy breaches via drone countermeasure(s) interface(s) 470.

Figure 5A:
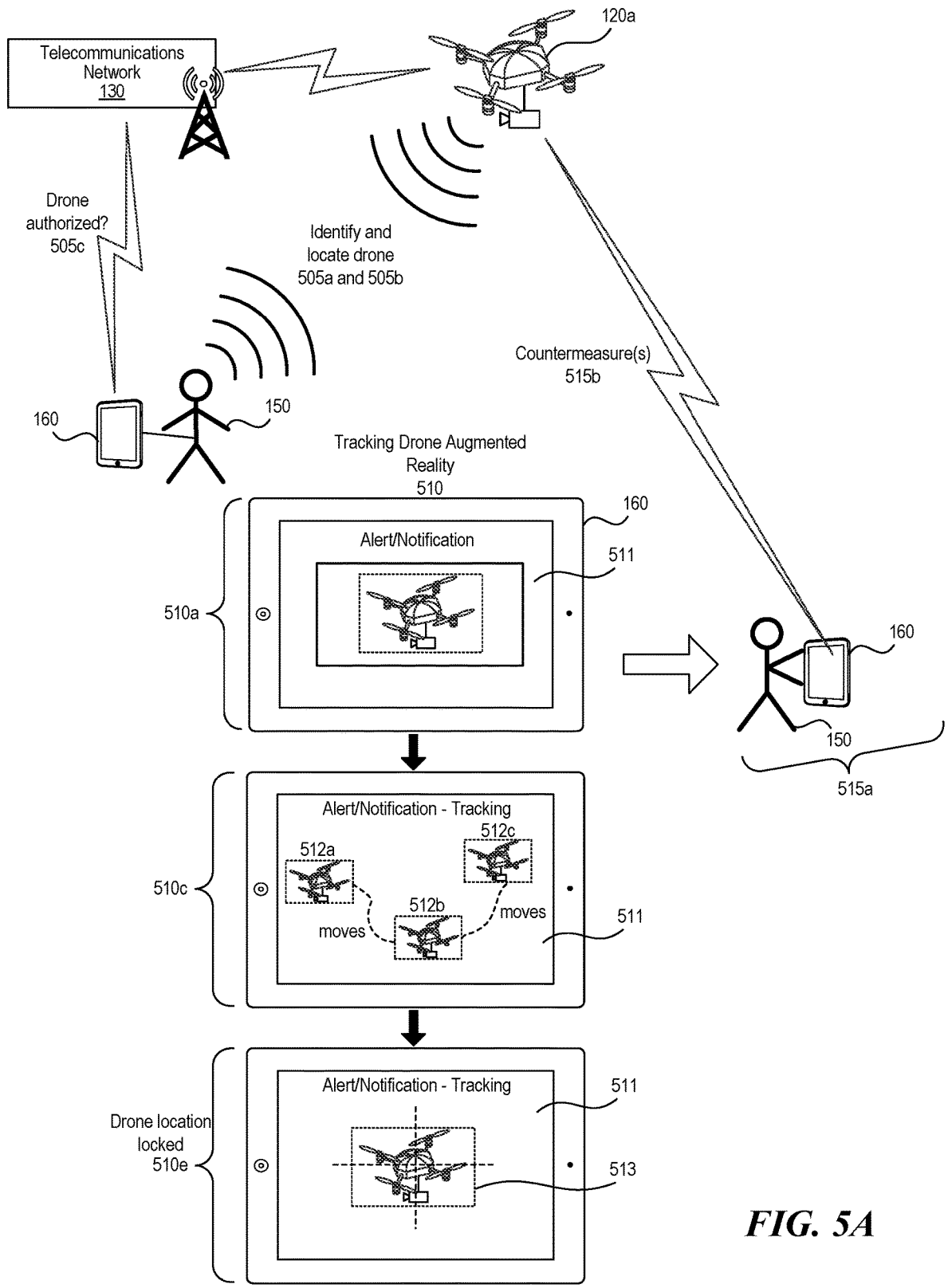
FIGS. 5A-5B are flow diagrams illustrating a set of operations for detecting, intercepting, and defending against drones according to various implementations.
Figure 5B:
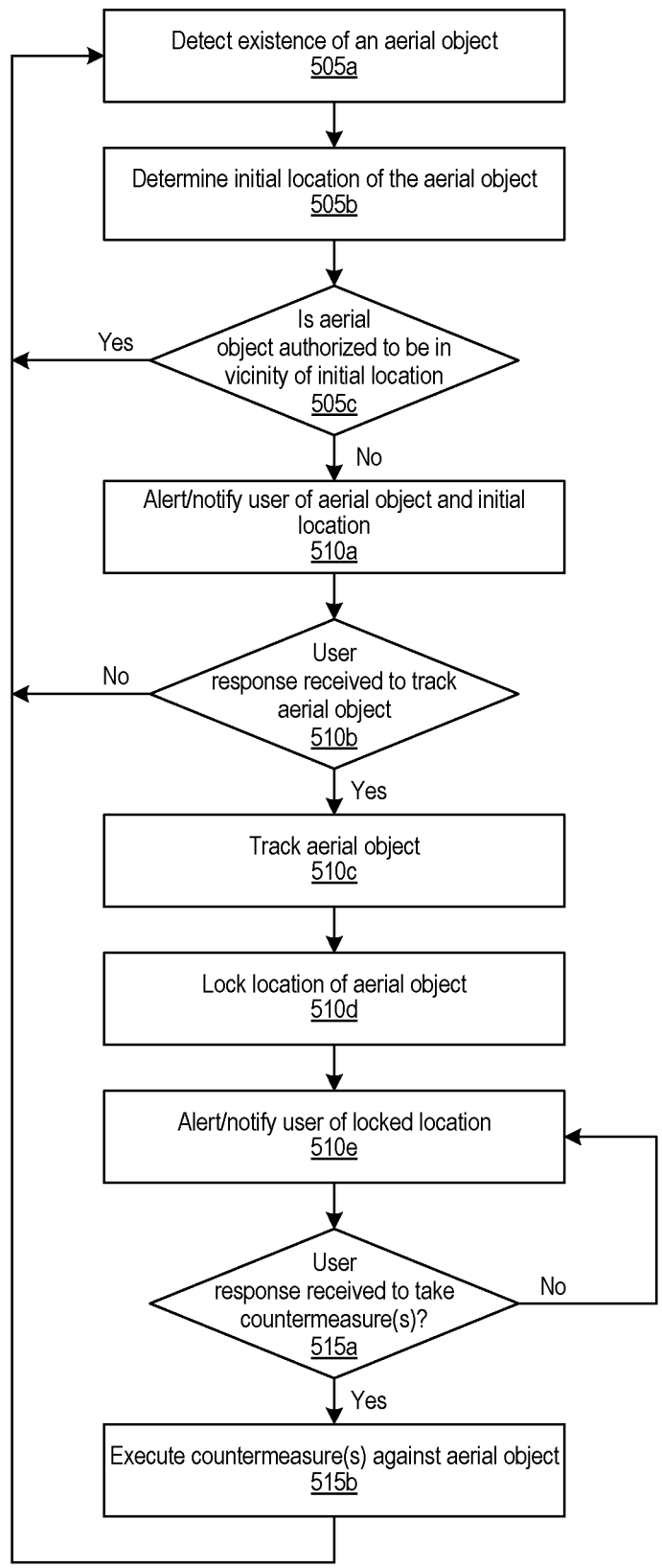

FIGS. 5A-5B are flow diagrams illustrating a set of operations performed by the system for detecting, intercepting, and defending against drones according to various implementations. At 505a, the system (using, for example, the detection and location module 205, FIG. 2) detects the existence of one or more drones in the vicinity (for example, within a configurable distance) of a configurable location. For example, a privacy defense system user previously configured the system to detect the presence of drones within 100 meters of the user's home. The user then configures different drone detection criteria by setting different drone defense variables or profiles based on one or more of the following factors:

privacy defense system user's location,
target location to be protected (for example, home, beach, boat, car, and so on),
area to be protected (for example, 100 square meters, 50 meter radius, along a 150 foot property perimeter), capabilities of target location to defend against privacy breach(es), identity and/or location of other users (for example, family members, friends, and so on), and so on.

Upon detecting the existence of at least one drone, at 505b, the system determines an initial location of the detected drone(s). The system can communicate with other information sources (for example, telecommunications network(s), social media (for example, drone operator's posts on social media describing their drone use), third-parties (for example, drone flight path services), and so on to determine and/or refine the initial location of the detected drone(s).

At 505c, the system determines whether one or more of the detected drones are authorized to be in the vicinity of the configurable location (for example, as delivery drones, authorized official use drones, the user's personal drones, and so on). The system can communicate with other information sources such as telecommunications network(s), social media (for example, drone operator's posts on social media describing their drone use), third-parties (for example, drone flight path services, FAA, delivery drone services, and so on), etc. to determine information about one or more aerial entities or drones that are authorized to be within the vicinity of the privacy defense system user or a detected location of the drone. If the drone is authorized, the system returns to block 505a and continues to monitor for other drones.

If the drone is not authorized, the system proceeds to block 510a where it alerts/notifies one or more users (drone operators and/or privacy defense system users) about the detected drone(s) and/or their initial location(s) using, for example, the alert/notification module 210, FIG. 2. The system alerts or notifies users based on default or user-provided drone detection criteria. For example, the system can detect a drone within 50 meters of a configurable location and only notify users who have indicated to be notified when a drone is detected within 75 meters of their location. The system will not notify users who have indicated to be notified only when a drone is within 25 meters of their location. The system can notify the user via one or more user devices. For example, the system can display the alert/notification at a user interface 511 on a user's mobile device 160. In several implementations, the system can transmit the notification to several user devices that can act in tandem to notify the user, for example, by emitting sounds, visual alerts (e.g., blinking/strobe lights), vibrations, and so on.

FIG. 6A is an example graphical user interface that can be used to notify a privacy defense system user of drones detected in the vicinity of a configurable location. An alert or notification 610 can be displayed on a user's device 160. The notification 610 can include information about the detected drones (for example, three drones detected within 100 meters). In addition, the user can view the drones on a map 615a, view details 615b of the drones, or both. A map view 620 can depict a relative position of a user with respect to one or more detected drones 120A-C and associated information, such as whether a drone is authorized. For example, as illustrated in FIG. 6A, map view 620 depicts a user 150, located at a geographical region/location (for example, a city or metro area) 107, and surrounded by two unauthorized drones 120A and 102C, and one authorized drone 120B. The user can select one or more drones to take an action, such as track the drone(s) 615c, lock location(s) of the drone(s) 615d, take one or more countermeasures 615e, contact the drones' operators 615f, and so on.

Figure 6B:
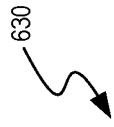
Figure 6C:
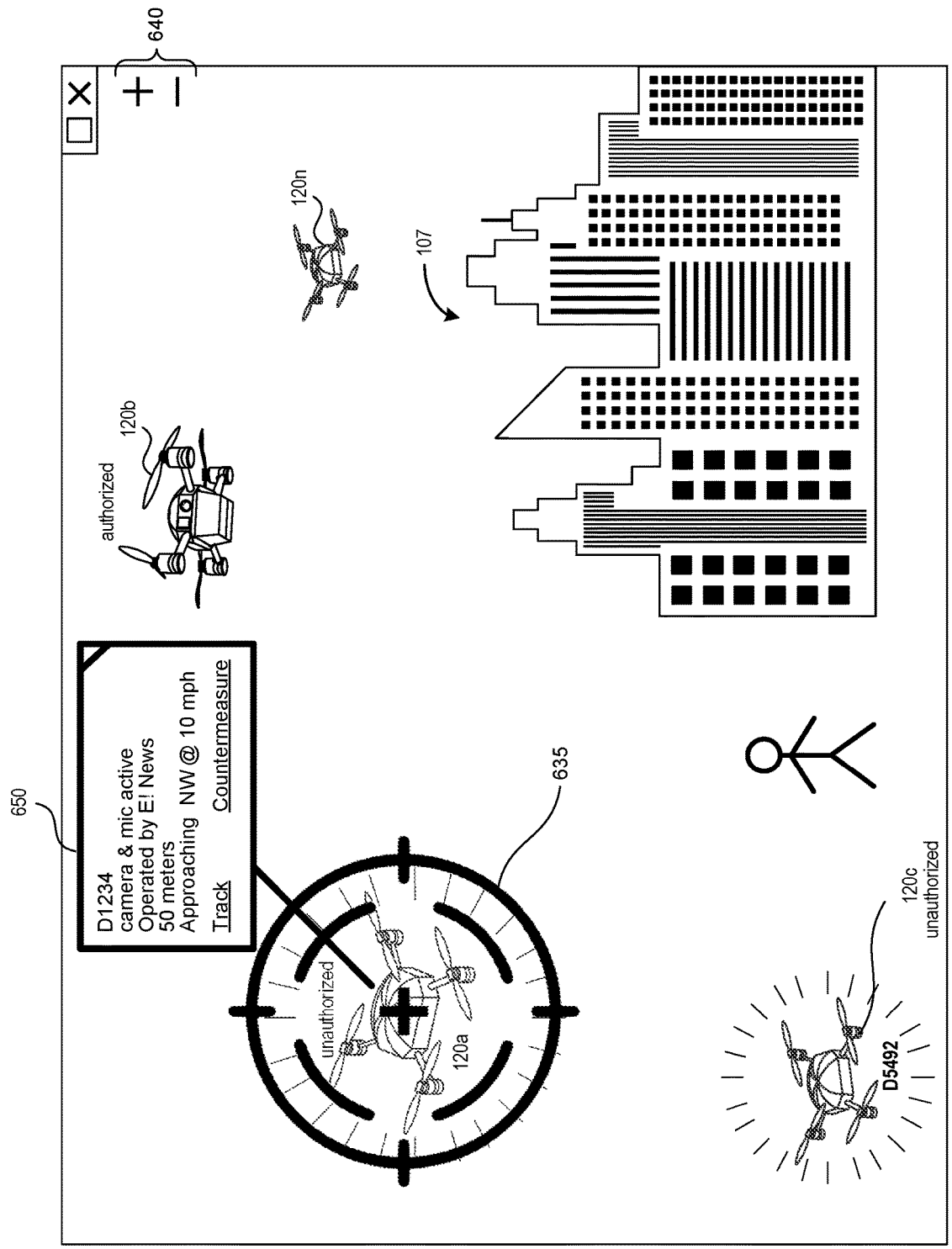

FIG. 6B is an example graphical user interface to display details 630 of one or more detected drones. For example, the user interface can display the following information about any detected drone: drone identifier 630a, operator(s)/affiliate(s) 630b, location 630c, distance from the privacy defense system user 630d, drone trajectory 630e, drone capabilities 630f, active capabilities of the drone 630g, available countermeasures for that drone 630h, and so on. A user can select available countermeasures to execute against selected drones. In several embodiments, certain countermeasures may not be available based on factors such as the current location of the drone, distance from the privacy defense system user, drone capabilities, and so on. For example, countermeasures to block both sound and camera of a drone may be available when the drone is over private property, but these countermeasures may not be available when the drone is over public property.

At 510b, the system can receive an indication from the privacy defense system user to track a detected drone (for example, using control 615c illustrated in FIG. 6A). As illustrated in FIG. 6C, a user can view the drones 120A-N detected in an environment 107 and select a drone 120A using a tracker control 635. The user can also select to view a snapshot of details of the drone, track the drone, and/or execute countermeasures using, for example, control 650. The user can use controls 640 to zoom in or out of the display.

If the privacy defense system user does not select a drone for tracking, the system returns to block 505a and continues to monitor for other drones. When the privacy defense system user selects one or more drones for tracking, the system proceeds to block 510c where the system tracks the selected drone(s). For example, as illustrated in FIG. 5A, user interface 511 displays the different locations 512A, 512B, and 512C of a detected drone as it moves around the user. At 510d, the system locks in a location of the drone (to enable the system to execute one or more countermeasures against the drone). The system can automatically lock a drone's location or receive an indication from the user to do so (for example, via control 615d, FIG. 6A). The system can lock the drone's location using global positioning system (GPS) data, radar sensors, distance computation software modules, line of sight measurements, and so on. For example, when the drone is subscribed to the same telecommunications network as the privacy defense system user, then the system can retrieve the drone's location from the telecommunications network. As another example, the system can measure line of sight manually via laser for precise distance from the user device's GPS coordinates and calculate the drone's precise location via software algorithms. When a drone's location is locked, the system, at 510e, notifies the user of the drone's locked location. For example, as illustrated in FIG. 5A, user interface 511 can display a locked location 513 of a selected drone.

At 515a, the system receives indication(s) from the user to take one or more countermeasures against a detected (and/or locked) drone. For example, as illustrated in FIG. 6B, a user can select to take a countermeasure using laser light against drone D1234 and a countermeasure using white noise obfuscation against drone D5492. For example, the system automatically selects a countermeasure for the selected drone (using, for example, the countermeasures module 220, FIG. 2). At 515b, the system can execute the selected countermeasures against the selected drone(s).

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

The invention claimed is:

1. A system for detecting, intercepting, and defending against breaches carried out by unmanned aerial vehicles, the system comprising a non-transitory computer-readable medium having instructions stored thereon, which when executed by one or more processors of the system cause the system to:
receive an indication of presence of an unmanned aerial vehicle within a vicinity of a mobile device;
output an alert notifying a user of the presence of the unmanned aerial vehicle within the vicinity of the mobile device by displaying alerts about two or more unmanned aerial vehicles simultaneously; and
receive instructions from the user by receiving, via a user interface: (1) a selection of at least one unmanned aerial vehicle among the two or more unmanned aerial vehicles, and (2) an action to be performed against the selected unmanned aerial vehicle, wherein the action comprises: tracking a location of the selected unmanned aerial vehicle, locking a location of the selected unmanned aerial vehicle, performing at least one countermeasure against the selected unmanned aerial vehicle, contacting an operator of the selected unmanned aerial vehicle, or any combination thereof, wherein the instructions enable execution of the at least one countermeasure against the unmanned aerial vehicle.

2. The system of claim 1, wherein the alert is based on one or more features of the unmanned aerial vehicle, or location of the unmanned aerial vehicle, or both.

3. The system of claim 1, wherein the instructions when executed by the one or more processors of the system further cause the system to:
output a trajectory of the unmanned aerial vehicle.

4. The system of claim 1, wherein the alert comprises information of the unmanned aerial vehicle, and wherein the information of the unmanned aerial vehicle comprises: features of the unmanned aerial vehicle, location of the unmanned aerial vehicle, proximity of the unmanned aerial vehicle to the mobile device or the location selected by the user, trajectory of the unmanned aerial vehicle, authorization status of the unmanned aerial vehicle, or any combination thereof.

5. The system of claim 1, wherein the instructions when executed by the one or more processors of the system further cause the system to:
output a visual representation depicting: a current location of the unmanned aerial vehicle, a trajectory of the unmanned aerial vehicle, a relative position of the unmanned aerial vehicle with respect to the mobile device or a location selected by the user, or any combination thereof.

6. The system of claim 1, wherein the instructions for outputting the alert cause the system to display alerts about two or more unmanned aerial vehicles simultaneously.

7. The system of claim 1, wherein the instructions when executed by the one or more processors of the system further cause the system to:
output a set of privacy breach countermeasures that can be performed against the unmanned aerial vehicle,
wherein the set of privacy breach countermeasures is determined based on one or more of the following: features of the unmanned aerial vehicle, location of the unmanned aerial vehicle, proximity of the unmanned aerial vehicle to the mobile device or the location selected by the user, trajectory of the unmanned aerial vehicle, authorization status of the unmanned aerial vehicle, or any combination thereof.

8. The system of claim 1, wherein the instructions when executed by the one or more processors of the system further cause the system to:
output a set of countermeasures that can be performed against the unmanned aerial vehicle, and
receive a selection of the at least one countermeasure from the set of countermeasures.

9. The system of claim 1, wherein the instructions when executed by the one or more processors of the system further cause the system to:
output a set of countermeasures that can be performed against the unmanned aerial vehicle,
wherein countermeasures in the set of countermeasures are ranked according to a priority value.

10. The system of claim 1, wherein the at least one countermeasure is executed for a configurable time period based on:
user preferences,
location of the unmanned aerial vehicle,
trajectory of the unmanned aerial vehicle,
proximity of the unmanned aerial vehicle to the mobile device or the location selected by the user,
features of the unmanned aerial vehicle,
or any combination thereof.

11. A method for detecting, intercepting, and defending against breaches carried out by unmanned aerial vehicles, the method comprising:
receiving an indication of presence of an unmanned aerial vehicle within a vicinity of a location;
outputting one or more signals indicative of the presence of the unmanned aerial vehicle within the vicinity of the location;
receiving instructions that enable execution of at least one countermeasure against the detected unmanned aerial vehicle; and
outputting a set of countermeasures that can be performed against the detected unmanned aerial vehicle,
wherein the countermeasures in the set of countermeasures are displayed in a ranked order.

12. The method of claim 11, wherein the location is a current location of mobile device or a location selected by a user.

13. The method of claim 11, wherein the one or more signals are outputted at a set of user equipment, and wherein two or more user equipment in the set of user equipment act in tandem to notify a user of the presence of the unmanned aerial vehicle.

14. The method of claim 11, wherein the signals are video signals, audio signals, visual alerts, haptic signals, vibrations, or any combination thereof.

15. The method of claim 11, wherein the signals are based on one or more features of the unmanned aerial vehicle, or location of the unmanned aerial vehicle, or both.

16. The method of claim 11, further comprising:
outputting a trajectory of the unmanned aerial vehicle.

17. The method of claim 11, wherein the at least one countermeasure is executed for a configurable time period based on:
user preferences,
location of the unmanned aerial vehicle,
trajectory of the unmanned aerial vehicle,
proximity of the unmanned aerial vehicle to the location,
features of the unmanned aerial vehicle,
or any combination thereof.

18. At least one computer-readable memory carrying instructions to be executed by at least one processor, wherein the instructions are for performing a method of defending against privacy breaches carried out by unmanned aerial vehicles, the method comprising:
receiving an indication of presence of at least one unmanned aerial vehicle within a vicinity of a mobile device;
outputting an alert notifying a user of the presence of the at least one unmanned aerial vehicle within the vicinity of the mobile device;
outputting a set of countermeasures that can be performed against the at least one unmanned aerial vehicle,
wherein the countermeasures in the set of countermeasures are displayed in a ranked order; and
receiving, via the mobile device, instructions that enable execution of at least one countermeasure against the at least one unmanned aerial vehicle.

19. The computer-readable memory of claim 18, wherein the method further comprises:
outputting a map depicting: a current location of the at least one unmanned aerial vehicle, a trajectory of the at least one unmanned aerial vehicle, a relative position of the at least one unmanned aerial vehicle with respect to the mobile device or a location selected by the user, or any combination thereof.

\* \* \* \* \*